US011928944B2

(12) United States Patent
Kornegay et al.

(10) Patent No.: US 11,928,944 B2
(45) Date of Patent: Mar. 12, 2024

(54) SENSOR ARRANGEMENT

(71) Applicant: Comcast Cable Communications, LLC, Philadelphia, PA (US)

(72) Inventors: Devlyn Kornegay, Richmond, VA (US); Michael Jou, Philadelphia, PA (US); Zhe Zhang, Wood Ridge, NJ (US); Henry Homza, Philadelphia, PA (US); Nicholas Stefano, Haddon Heights, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/172,025

(22) Filed: Feb. 21, 2023

(65) Prior Publication Data

US 2023/0351875 A1 Nov. 2, 2023

Related U.S. Application Data

(63) Continuation of application No. 17/323,428, filed on May 18, 2021, now Pat. No. 11,610,463.

(51) Int. Cl.
*G08B 13/24* (2006.01)
*E06B 5/11* (2006.01)
*G08B 13/08* (2006.01)

(52) U.S. Cl.
CPC ............ *G08B 13/2491* (2013.01); *E06B 5/11* (2013.01); *G08B 13/08* (2013.01)

(58) Field of Classification Search
CPC ........ G08B 13/2491; G08B 13/08; E06B 5/11
See application file for complete search history.

(56) References Cited

U.S. PATENT DOCUMENTS 9,589,446 B1 * 3/2017 Dey ..................... G08B 25/008
10,527,589 B2 * 1/2020 Kolb ...................... G01N 29/30
11,275,059 B2 * 3/2022 Kolb ...................... G01N 29/30
2004/0114133 A1 * 6/2004 Furiya .................... G01N 21/95 356/237.1
2008/0201097 A1 * 8/2008 Stromberg ........... G01B 11/272 702/94
2010/0193398 A1 * 8/2010 Marsh ..................... H01J 37/20 29/428
2012/0012742 A1 * 1/2012 Ren ........................ A61B 6/587 250/252.1
2016/0298950 A1 * 10/2016 Modi ....................... G01B 7/14
2017/0067859 A1 * 3/2017 Kolb ...................... G01N 29/30
2017/0098356 A1 * 4/2017 Dai ........................ G01R 33/02
2018/0357866 A1 * 12/2018 DiPoala ............. G08B 13/1436
2018/0365943 A1 * 12/2018 DiPoala ............... G08B 29/046

(Continued)

*Primary Examiner* — Curtis J King
(74) *Attorney, Agent, or Firm* — Banner & Witcoff, Ltd.

(57) ABSTRACT

Disclosures relate to a sensor system and arrangements having different sized removable spacers. The spacers may be mixed and matched as needed or desired to compensate for misalignment conditions. Further, different spacer combinations and adjustments may be guided by a security management computing device. Variations in configurations of mounting surfaces, such as door and window assemblies, may be accommodated. Alignment of a transmitter or a receiving device, e.g., a magnetic device, with respect to a transmitter or receiving device despite misalignment of the components due to, for example, uneven surfaces of a door or a window, or a respective frame may be achieved.

20 Claims, 9 Drawing Sheets

(56) References Cited

U.S. PATENT DOCUMENTS

| | | | | |
|---|---|---|---|---|
| 2020/0103376 | A1* | 4/2020 | Kolb | G01N 29/2418 |
| 2021/0383662 | A1* | 12/2021 | Gruber | G01D 5/20 |
| 2022/0155261 | A1* | 5/2022 | Kolb | G01N 29/2418 |
| 2023/0243671 | A1* | 8/2023 | Melvin | E06B 5/16<br>49/14 |

* cited by examiner

SENSOR ARRANGEMENT

CROSS-REFERENCE TO RELATED APPLICATIONS

This application is a continuation of and claims priority to U.S. patent application Ser. No. 17/323,428, filed May 18, 2021, which is hereby incorporated by reference in its entirety.

BACKGROUND

Fitting and installing security or intrusion detection devices such as window or door sensors may be challenging due to the wide variety of different door and window configurations, sizes, and positions available. A door or window sensor may comprise two pieces in alignment, with one piece adaptable to be affixed to a door or a window element, and the other piece adaptable to be affixed to a frame element. When the two pieces are separated from each other, for example upon opening of a door or a window, an alarm may be tripped. In many instances, such as misalignment, e.g., a recession, in the door or window frame, the two pieces might not align and may lead to sensing issues. Such misalignment may occur in several planes and might cause false alarms, incorrect status indications, or leave a perimeter unguarded.

SUMMARY

The following summary presents a simplified summary of certain features. The summary is not an extensive overview and is not intended to identify key or critical elements.

Systems, apparatuses, and methods are described for a sensor arrangement. In particular, one or more aspects relate to a sensor arrangement (e.g., a sensor kit) for enabling customized installation and proper placement, orientation and operation of a security or intrusion detection system via movable components, such as spacers. The components may be of variable sizes or heights (e.g., different thicknesses) and may be selected, mixed and matched as needed or desired. One advantage that may be achieved with the sensor arrangement is the alignment of a transmitter or a receiving device, e.g., a magnetic device, with respect to a transmitter or receiving device despite misalignment of the components due to, for example, uneven surfaces of a door or a window (e.g., on which a magnetic component may be mounted), or a respective frame (e.g., on which the magnetic sensor may be mounted).

The variations in configurations of mounting surfaces, such as door and window assemblies, may be accommodated.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
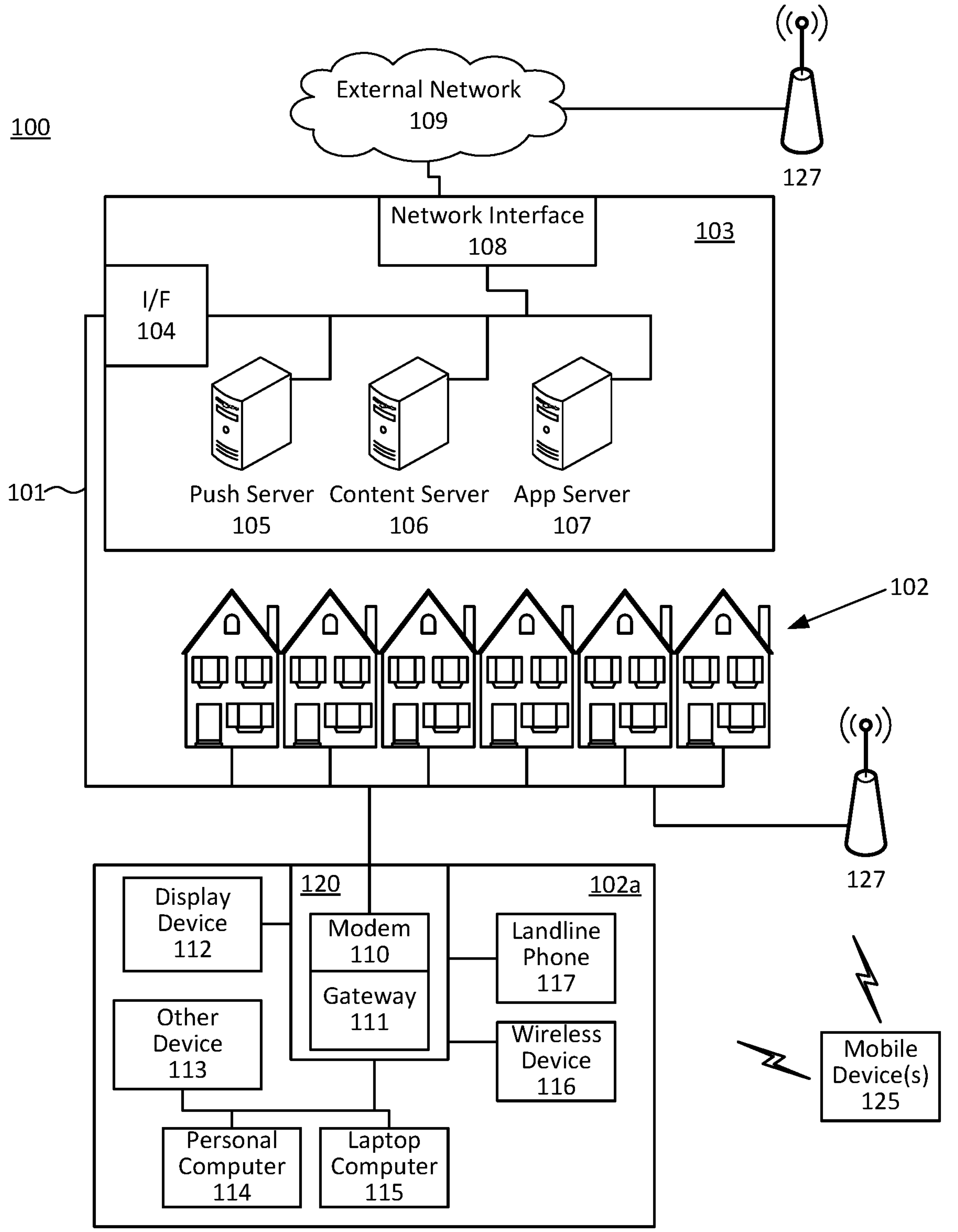
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery of the content. The application server 107 (e.g., which may be and/or include a control panel device) may be configured to offer any desired service. For example, an application server may be responsible for receiving and transmitting communications related to a security system in accordance with the present disclosure. The application server 107 may support security processes that rely on one or more sensors to monitor conditions in premises 102 (e.g., registering sensors, detecting alarm events, reacting to alarm events, and communicating alarm events over one or more networks). For example, the application server 107 may assess the need to instigate an alarm from the information provided by sensors. Data regarding the monitored conditions may be communicated over a network to the content server 106. Although shown separately, the push server 105, the content server 106, and the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
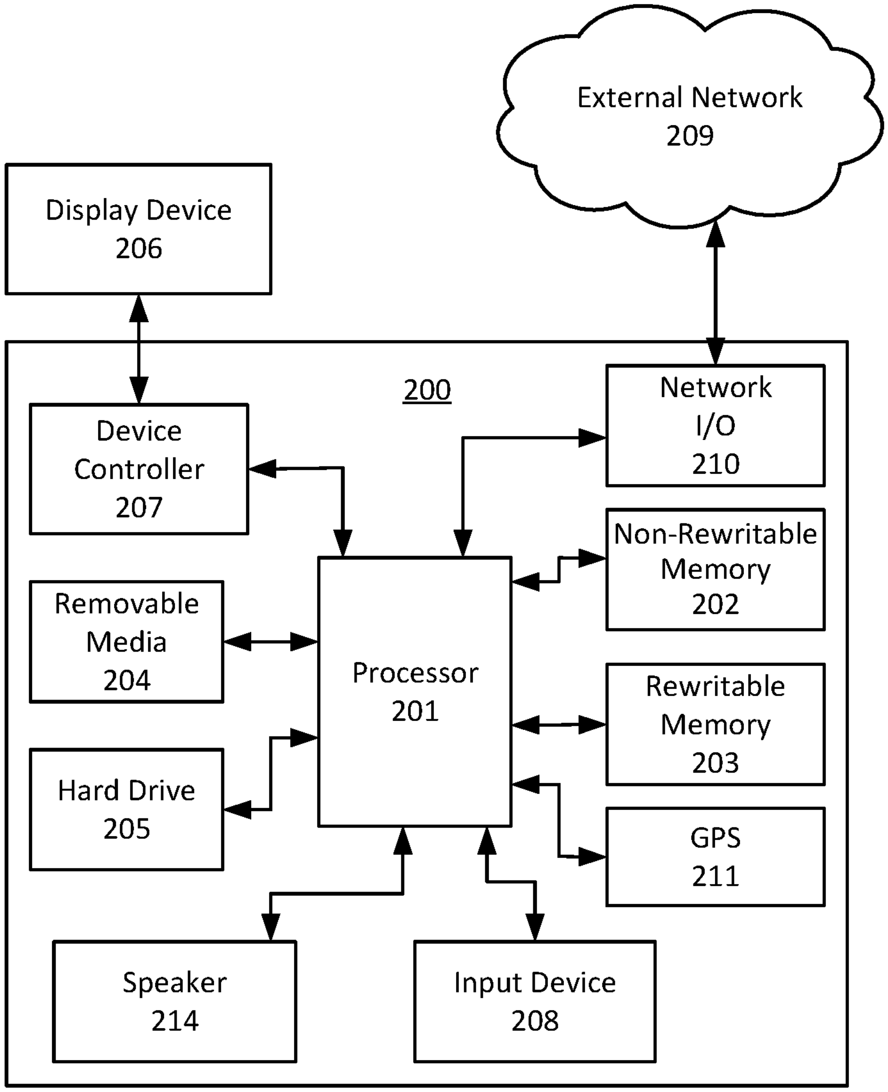
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., a security management computing device, such as a home security device). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
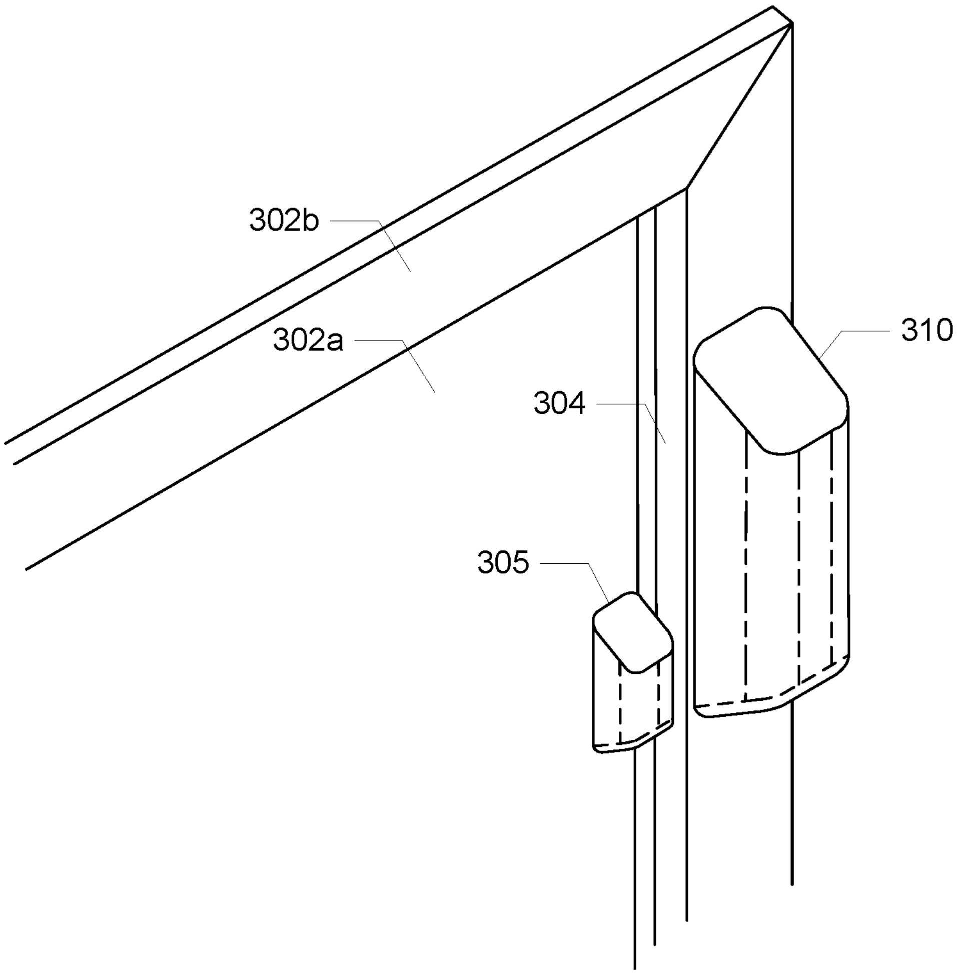
FIG. 3 is a perspective view of an example sensor arrangement on a misaligned door and door frame.

FIG. 3 is a perspective view of an example sensor arrangement on a misaligned door and door frame. Although the discussion below relates to door and door frame assemblies, aspects described herein may also apply to other types of openings, including windows, entryways, and cabinets (e.g., keep safe boxes or cabinets, sheds, storage units, or the like). As shown in FIG. 3, a door 302*a* and a door frame 302*b* may be misaligned and cause a space 304 between the door 302*a* and door frame 302*b*. The space 304 decreases the ability of the magnetic sensor 310 to detect a magnetic device (e.g., within magnetic component 305). Therefore, proper installation of the sensor arrangement may be affected or prevented. For example, the space 304 between the door 302*a* and door frame 302*b* may be so large that the sensor arrangement may be deemed incompatible and unusable with a particular door and door frame assembly. Such misalignments, which may occur in several planes (e.g., a lateral direction or a vertical direction), may give rise to false alarms or incorrect status indications.

Figure 4A:
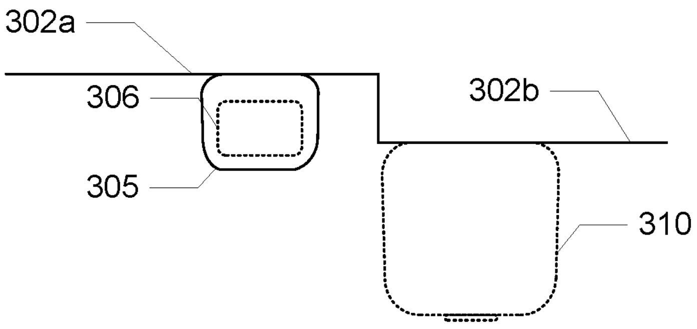
FIG. 4A is a top view of an example sensor arrangement on a misaligned door and door frame.
Figure 4B:
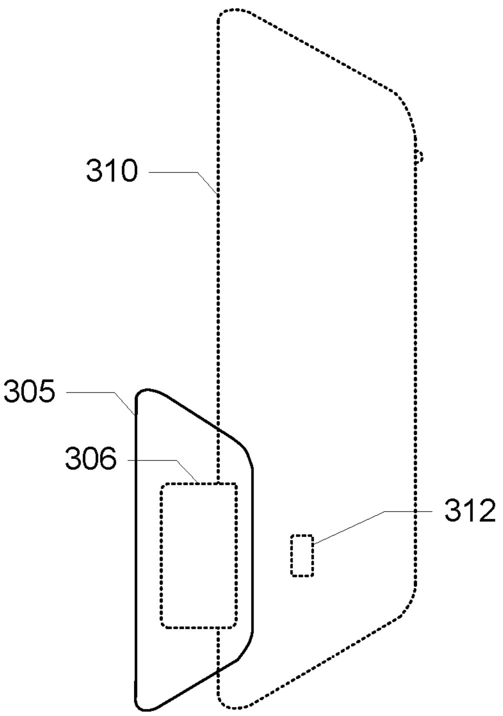
FIG. 4B is a side view of an example sensor arrangement on a misaligned door and door frame.

FIG. 4A is a top view of an example sensor arrangement on a misaligned door and door frame. FIG. 4B is a side view of an example sensor arrangement on a misaligned door and door frame. The top view depicted in FIG. 4A corresponds to the side view depicted in FIG. 4B. The top view depicted in FIG. 4A and the side view depicted in FIG. 4B also correspond to the perspective view depicted in FIG. 3. As shown in FIGS. 4A and 4B, when a door 302*a* is misaligned from a door frame 302*b*, magnetic component 305 (e.g., housing a magnet 306) becomes misaligned with magnetic sensor 310.

Various features described herein offer improved and wider range of sensor arrangement possibilities. For example, the sensor arrangement may include two main parts (e.g., a magnetic sensor and a magnetic component) and optional subparts (e.g., spacers).

The magnetic sensor may operate as a Hall-effect sensor 312 or other magnetically operated sensor. For example, as depicted in FIG. 4B, the magnetic sensor may include a Hall-effect sensor 312 that measures the magnitude of a magnetic field and detects a change in the magnetic field according to displacement of the magnetic component 305. The magnetic sensor may be combined with threshold detection and operate as an electronic switch. Although the discussion herein relates to sensor arrangements including a magnetic sensor, aspects described herein may also apply to any other type of sensor, such as, without limitation, a reed switch, a magnetic sensor, a capacitive sensor, an optical sensor, a motion sensor, or the like.

Figure 5A:
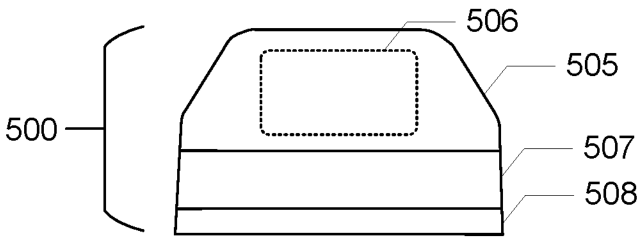
FIG. 5A is a side view of an example magnetic component with spacers attached thereto.
Figure 5B:
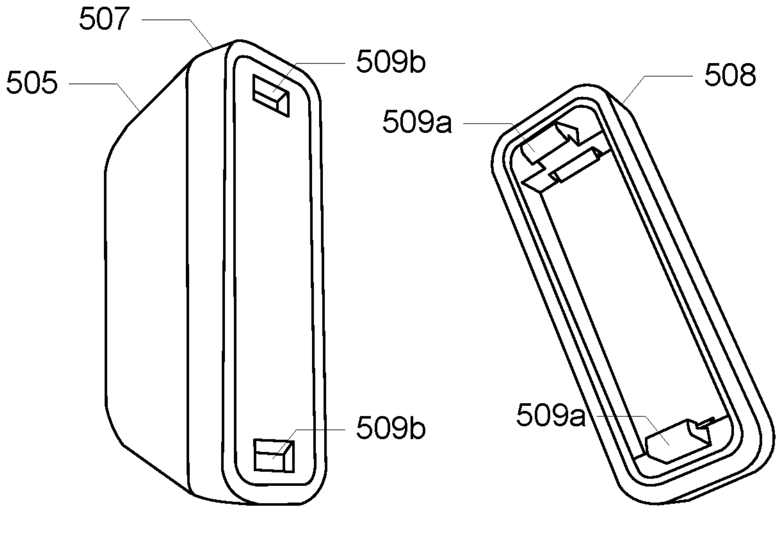
FIG. 5B shows the magnetic component of FIG. 5A, with one spacer attached to a device housing and one spacer detached from the device housing.

The magnetic component may include more than one spacer attached thereto (e.g., two spacers). An example magnetic component 500 is depicted in FIGS. 5A and 5B. While two spacers are shown in FIGS. 5A and 5B, it will be appreciated that more than two spacers may be used, and the spacers may all be interchangeable and assembled in any desired combination to achieve a desired alignment depending on a degree of misalignment between a first member (e.g., door, window, etc.) and a second member (e.g., door frame, window frame, etc.). The spacers may work with sensors of any type.

The magnetic component 500 and the magnetic sensor 600 may have a maximum distance rating, in which the components must be within a maximum distance from each other for reliable operation.

As shown in FIG. 5A, the magnetic component 500 may include a device housing 505, a first spacer 507 securable or attached to the device housing 505 and a second spacer 508 securable or attached to the device housing 505 and the first spacer 507. One of the spacers is thicker than the other. For instance, the first spacer 507 may be thicker than the second spacer 508, or vice versa. The first spacer 507 may have a thickness of six millimeters and the second spacer 508 may have a thickness of three millimeters. Although FIG. 5A shows two spacers stacked, it will be appreciated that more than two spacers could be stacked using additional spacers of same or different thicknesses to cure a misalignment (e.g., between a door and a corresponding frame).

The device housing 505 may include a magnet 506 adjustably disposed in the device housing 505. For example, the position of magnet 506 may be adjusted in a space within the housing to achieve desired or optimal operating conditions. For example, the position of the magnet 506 may be adjustable to fit within various height spaces or sockets within the housing.

The device housing 505 may be secured on or above the first spacer 507. In some embodiments, the device housing 505 may be secured on or above the second spacer 508. In some embodiments, the first spacer 507 may be disposed between the device housing 505 and the second spacer 508.

The device housing 505, the first spacer 507, and the second spacer 508 may slide or snap together to form the magnetic component 500. For example, FIG. 5B shows the magnetic component 500 of FIG. 5A, with one spacer (e.g., spacer 507) attached to the device housing 505 and one spacer (e.g., spacer 508) detached (e.g., unsnapped) from the device housing 505. An example snapping mechanism is also shown, where protrusions 509*a* snap into snap holes 509*b*. For instance, spacer 508 may be attached to spacer 507 by pressing the protrusions 509*a* into holes 509*b* until the spacer 508 snaps into place. In some embodiments, spacer 508 may be attached to spacer 507 by sliding together via built-in connectors that connect one member to another member. Device housing 505 and spacer 507 may include a similar snapping or sliding mechanism.

The sensor arrangement may be installed to detect the opening of a door or window. When the door or window is closed, the magnetic sensor and corresponding magnetic component are aligned in close proximity another (e.g., within or less than a threshold distance) to one another, forming a closed circuit. Opening a door or window breaks the circuit and may trigger an alarm.

Figure 6A:
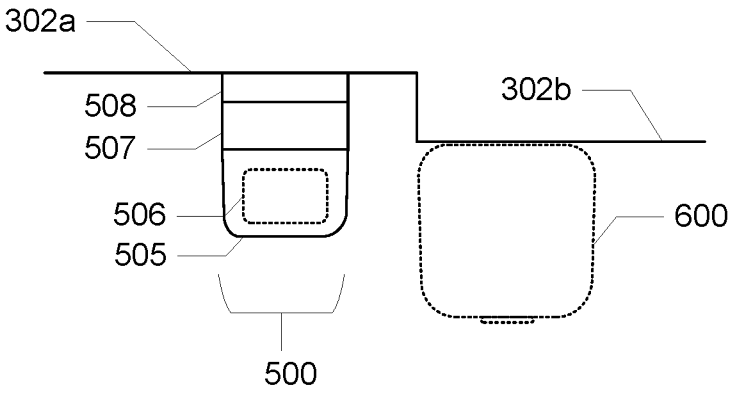
FIG. 6A is a top view of an example sensor arrangement showing alignment of a magnetic sensor and a magnetic component despite a misaligned door and door frame.
Figure 6B:
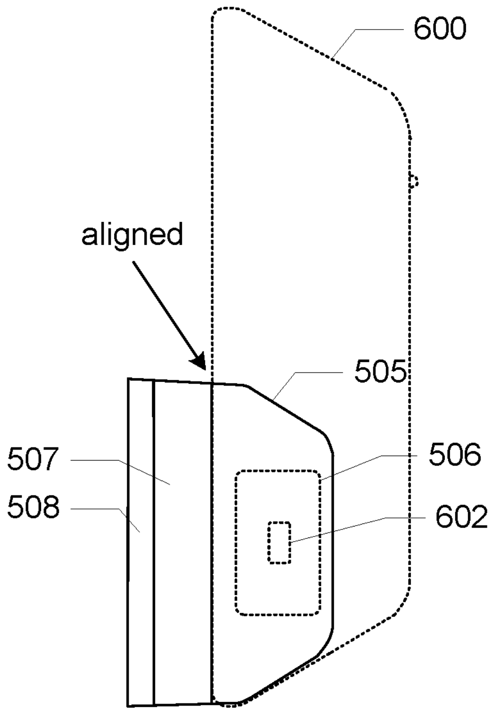
FIG. 6B is a side view of an example sensor arrangement showing alignment of a magnetic sensor and a magnetic component despite a misaligned door and door frame.

FIG. 6A is a top view of an example sensor arrangement showing alignment of a magnetic sensor and a magnetic component despite a misaligned door and door frame. FIG. 6B is a side view of an example sensor arrangement showing alignment of a magnetic sensor and a magnetic component despite a misaligned door and door frame. The top view depicted in FIG. 6A corresponds to the side view depicted in FIG. 6B.

The magnetic component 500 may be positioned on a first member (e.g., door, window, etc.) and the magnetic sensor 600 may be positioned on a second member (e.g., door frame, window frame, etc.), such that the magnetic sensor 600 is positioned adjacent to (e.g., aligned with and next to, above, or below) the side of the magnetic component 500. For instance, the magnetic component 500 may be positioned on a moveable member such as a door or a window (e.g., FIG. 6A at 302*a*), and the magnetic sensor 600 may be positioned on a stationary member such as a door frame (e.g., including the sill, jamb, or head), a window frame (e.g., including the head, jamb, or sill), or a wall (e.g., FIG. 6A at 302*b*).

The sensor arrangement in FIGS. 6A and 6B may use the magnetic component 500 depicted in FIG. 5A, which includes a device housing 505 (e.g., housing a magnet 506), a first spacer 507, a second spacer 508. In such an arrangement, magnetic component 500 and magnetic sensor 600 may be aligned despite a misaligned door 302*a* and door frame 302*b*.

The magnetic sensor may operate as a Hall-effect sensor 602 or magnetically operated sensor. For example, as depicted in FIG. 6B, the magnetic sensor may include a Hall-effect sensor 602 that measures the magnitude of a magnetic field and detects a change in the magnetic field according to displacement of the magnetic component 500. The magnetic sensor may be combined with threshold detection and operate as an electronic switch. Although the discussion herein relates to sensor arrangements including a magnetic sensor, aspects described herein may also apply to any other type of sensor, such as, without limitation, a reed switch, a magnetic sensor, a capacitive sensor, an optical sensor, a motion sensor, or the like.

Additionally or alternatively, although FIGS. 6A and 6B show magnetic component 500 positioned on a first member (e.g., door, window, etc.) and the magnetic sensor 600 positioned on a second member (e.g., door frame, window frame, etc.), it will be appreciated that placement in other configurations are possible and contemplated, including placement the other way around, such that the magnetic sensor 600 is positioned on the first member (e.g., door, window, etc.) and the magnetic component 500 is positioned on the second member (e.g., door frame, window frame, etc.).

Additionally or alternatively, although FIGS. 6A and 6B show spacers 507, 508 attached to housing 505 of magnetic component 500, it will be appreciated that such spacers could be attached to magnetic sensor 600.

Figure 7:
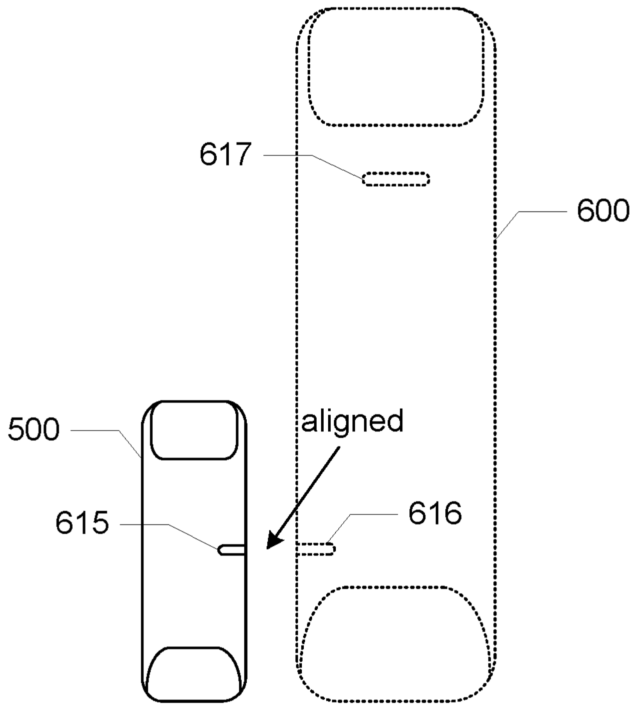
FIG. 7 is a front view of an example sensor arrangement showing alignment of notches.

As shown in FIG. 7, the sensor arrangement may include one or more indicators associated with at least one of the magnetic component 500 or the magnetic sensor 600 that may facilitate alignment in multiple directions of the magnetic component 500 with the magnetic sensor 600. The sensor 600 may include indicia 616, 617 or other additional features (e.g., one or more markings such as an arrow or line) to facilitate the placement (e.g., identify a proper position and orientation) of the sensor 600 with respect to the magnetic component 500 (e.g., which houses the magnet). The sensor arrangement may include a light-emitting component 617 associated with at least one of the magnetic component 500 or the magnetic sensor 600 configured to emit a visual indication of whether the magnetic component 500 is aligned with the magnetic sensor 600. For instance, the visual indication may be a steady light, or a flashing or blinking light, which may include different colors, signaling success or failure of the alignment of various components (e.g., the alignment between the magnetic component 500 and the magnetic sensor 600).

The magnetic sensor 600 may detect alignment of the magnetic component 500 in a lateral direction and in a vertical direction relative to a housing. As shown in FIG. 6B, alignment in the lateral direction may include aligning (e.g., lining up) a base of the device housing 505 with a base of the magnetic sensor 600. As shown in FIG. 7, alignment in the vertical direction may include aligning (e.g., lining up) a notch 615 on the magnet component 500 with a notch 616 on the sensor 600 (e.g., to complete the circuit).

Figure 8:
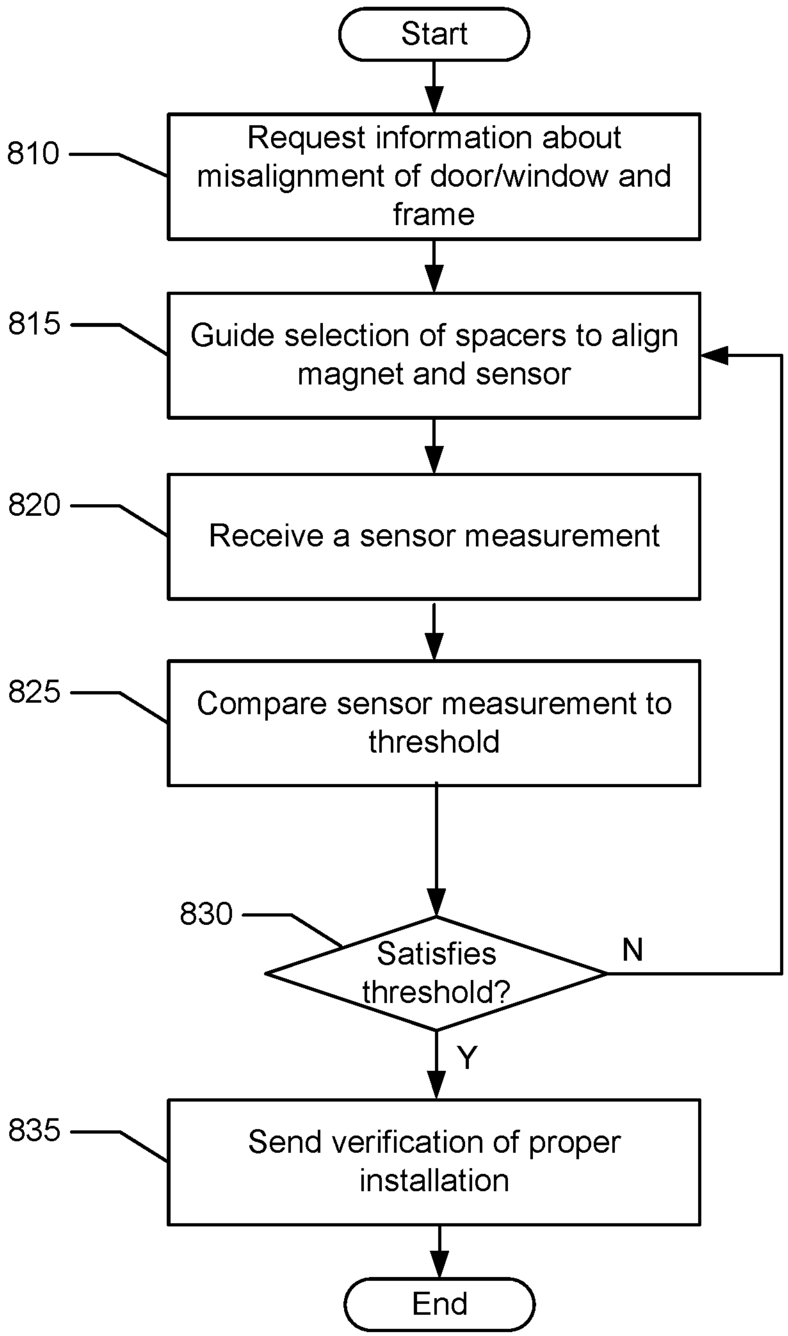
FIG. 8 is a flow chart showing an example method for installing and adjusting a sensor arrangement.

Operation of the sensor arrangement will be further explained below with reference to FIG. 8, which illustrates an example installation and adjustment process for a sensor arrangement. The process itself may be performed by any desired computing device that can monitor a magnetic sensing component, with some portions performed by a security management computing device, such as application server 107.

In step 810, the security management computing device (which can be a remote application server 107, or any other shared or stand alone computing device) may request information about a door or window and corresponding frame assembly on which the sensor arrangement (e.g., including a magnetic component and a magnetic sensor) is being installed. The security management computing device may be in communication with a user computing device (e.g., a user mobile device) and configured to monitor the magnetic sensor. For example, the security management computing device may request a user of the user device to measure a height of a door or window misalignment with respect to a corresponding frame. For instance, the security management computing device may request information regarding a distance or a height of a recess formed between a door portion and a frame portion when the door is in a closed position (e.g., space 304 in FIG. 3). As discussed above, to be effective, the sensor arrangement may require that the magnetic component and the magnetic sensor be in accurate alignment when the door or window is in the closed position.

In step 815, the security management computing device may assist or guide the user of the user device in selecting a combination of spacers for aligning a magnet (e.g., housed in the magnetic component) and the magnetic sensor. For example, the security management computing device may recommend one or more possible combinations of spacers that would be compatible with or cure the misalignment measured in step 810. As discussed above, there may be any number of spacers in the sensor arrangement, and the spacers might be provided with a plurality of different heights, for example, to allow more flexibility in mixing or matching to achieve alignment.

Based on a selected combination of spacers of the one or more possible combinations, the security management computing device may further assist or guide the user of the user device in installing and aligning the respective components of the sensor arrangement (e.g., installing the magnetic component on the door or window portion, installing the magnetic sensor on the corresponding frame portion, and aligning the magnetic component with the magnetic sensor). For example, the user device may display and/or otherwise present one or more graphical user interfaces that may include text, images, and/or other information guiding the user of the user device (e.g., via a mobile phone application) of the foregoing installing and aligning steps (e.g., presenting each step in a step-by-step or intuitive manner).

The magnetic component and the magnetic sensor may include a surface (e.g., a base surface thereof) with an adhesive portion which may be a peel-and-stick type adhesive for affixing the magnetic component and the magnetic sensor on various surfaces and at various positions.

An LED (light-emitting diode) or other indicator (e.g., light-emitting component 617) may provide a state of the alignment. For instance, the security management computing device may provide feedback via the LED indicator to indicate that a magnetic is aligned with the magnetic sensor. The LED (e.g., located on the magnetic sensor) may blink or flash when the magnet is misaligned, and remain steady when the magnet is aligned. There may be a signal strength range for acceptable alignment. The LED may include a fast flash (e.g., indicating alignment is suboptimal or even lost), a slow flash (e.g., indicating alignment is near optimal but not yet within an acceptable range), and/or a steady light (e.g., indicating acceptable alignment). It will be appreciated that other and/or different indications may also be provided, including other visual indications, or sound indications.

In step 820, during or after installation, the security management computing device may receive a sensor measurement from the magnetic sensor. For example, the security management computing device may receive a measurement (e.g., a numerical or other output value) of the uniformity, magnitude, or intensity of the magnetic field sensed by the magnetic sensor during the alignment process. For instance, the uniformity, magnitude, or intensity of the magnetic field sensed by the magnetic sensor may vary depending on the position or placement of the magnet with respect to the magnetic sensor.

In step 825, the security management computing device may compare the sensor measurement to a predetermined threshold value. The threshold value may be set by a user, a distributor, a manufacturer of the device, or other individual in control of the device.

In step 830, the security management computing device may determine whether proper installation has been achieved. This may occur, for example, if the sensor measurement satisfies a predetermined threshold. For instance, the sensor measurement may satisfy the predetermined threshold when a conductivity, signal strength, magnetic strength, or the like, equals or exceeds the predetermined threshold).

Figure 9:
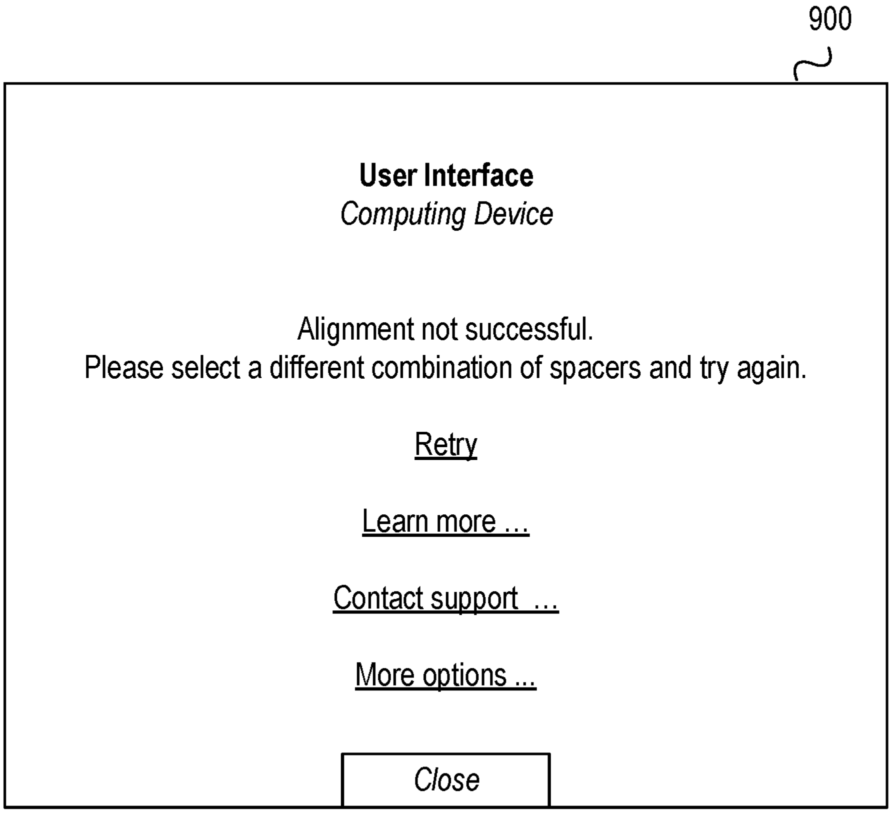
FIG. 9 shows an example user interface for installing and adjusting a sensor arrangement.

In step 830, the security management computing device may send an alert message indicative of an alert condition to the user device, so that quick and reliable installation is facilitated. For example, if alignment is successful (e.g., the sensor measurement satisfies a predetermined threshold), the process may proceed to step 835. In step 835, the security management computing device may send verification of proper installation to the user device and the process in FIG. 8 can conclude. However, if alignment is unsuccessful (e.g., the sensor measurement fails to satisfy a predetermined threshold, the security management computing device may return to step 815. In step 815, the security management computing device may request the user to select a different combination or arrangement of spacers for aligning a magnetic component and a magnetic sensor, and the process in steps 815 through 830 may be repeated until successful alignment is achieved. For example, the user device may display and/or otherwise present one or more graphical user interfaces similar to graphical user interface 900, which is illustrated in FIG. 9. As seen in FIG. 9, graphical user interface 900 may include text and/or other information notifying the user of the user device (e.g., via a mobile phone application) of an installation status of the sensor arrangement (e.g., "Alignment not successful. Please select a different combination of spacers and try again. [Retry . . . ] [Learn more . . . ] [Contact Support . . . ] [More options . . . ]"). It will be appreciated that other and/or different notifications may also be provided.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. One or more non-transitory computer-readable media storing instructions that, when executed, configure a computing device to:

guide a selection of a first combination of spacers, for installation of a first sensor component, based on misalignment between a first member and a second member;

receive a first sensor measurement of a magnetic field sensed by a second sensor component positioned on one of the first member or the second member;

determine that the first sensor measurement fails to satisfy a predetermined threshold; and send a notification to one or more user devices to select a second combination of spacers, different from the first combination, for installation of the first sensor component.

2. The one or more non-transitory computer-readable media of claim 1, wherein the instructions, when executed, further configure the computing device to:

determine that a second sensor measurement satisfies the predetermined threshold; and send, to the one or more user devices based on the second sensor measurement, a notification of successful installation to the one or more user devices.

3. The one or more non-transitory computer-readable media of claim 1, wherein the instructions, when executed, further configure the computing device to receive the first sensor measurement by receiving an output value that corresponds with a measurement of one or more of uniformity of the magnetic field, magnitude of the magnetic field, or intensity of the magnetic field sensed by the second sensor component.

4. The one or more non-transitory computer-readable media of claim 1, wherein the instructions, when executed, further configure the computing device to request information of the misalignment between the first member and the second member.

5. One or more non-transitory computer-readable media storing instructions that, when executed, configure a computing device to:

receive information indicating a misalignment between a first member and a second member;

guide selection of a combination of spacers, comprising a first spacer and a second spacer, based on the misalignment between the first member and the second member, to form a first sensor component, for alignment with a second sensor component, based on attaching the first spacer to a device housing and attaching the second spacer to the first spacer; and send verification of proper installation of the first sensor component.

6. The one or more non-transitory computer-readable media of claim 5, wherein the instructions, when executed, further configure the computing device to output information for forming the first sensor component by sliding or snapping together the device housing, the first spacer, and the second spacer.

7. The one or more non-transitory computer-readable media of claim 5, wherein the instructions, when executed, further configure the computing device to output information for:

positioning the first sensor component on the first member; and positioning the second sensor component on the second member, such that the second sensor component is adjacent to the first sensor component.

8. The one or more non-transitory computer-readable media of claim 5, wherein the instructions, when executed, further configure the computing device to output information for:

positioning the first sensor component on a moveable member; and positioning the second sensor component on a stationary member.

9. The one or more non-transitory computer-readable media of claim 5, wherein the instructions, when executed, further configure the computing device to output information for:

adjusting a magnet disposed in the device housing of the first sensor component.

10. A system comprising:

a computing device and a first combination of spacers, wherein the computing device is configured to:

guide a selection of the first combination of spacers, for installation of a first sensor component, based on misalignment between a first member and a second member;

receive a first sensor measurement of a magnetic field sensed by a second sensor component positioned on one of the first member or the second member;

determine that the first sensor measurement fails to satisfy a predetermined threshold; and send a notification to one or more user devices to select a second combination of spacers, different from the first combination, for installation of the first sensor component.

11. The system of claim 10, wherein the computing device is further configured to:

determine that a second sensor measurement satisfies the predetermined threshold; and send, to the one or more user devices based on the second sensor measurement, a notification of successful installation to the one or more user devices.

12. The system of claim 10, wherein the computing device is configured to receive the first sensor measurement by receiving an output value that corresponds with a measurement of one or more of uniformity of the magnetic field, magnitude of the magnetic field, or intensity of the magnetic field sensed by the second sensor component.

13. The system of claim 10, wherein the computing device is further configured to request information of the misalignment between the first member and the second member.

14. The system of claim 10, wherein the computing device is further configured to measure the misalignment between the first member and the second member.

15. The system of claim 10, wherein the computing device is further configured to output instructions for forming the first combination of spacers by attaching a first spacer to a device housing and attaching a second spacer to the first spacer.

16. The system of claim 10, wherein the computing device is further configured to output instructions for sliding or snapping together the first combination of spacers and a device housing.

17. The system of claim 10, wherein the computing device is further configured to output instructions for:

positioning the first sensor component on the first member; and positioning the second sensor component on the second member, such that the second sensor component is adjacent to the first sensor component.

18. The system of claim 10, wherein the computing device is further configured to output instructions for:

positioning the first sensor component on a moveable member; and positioning the second sensor component on a stationary member.

19. The system of claim 10, wherein the computing device is further configured to output instructions for adjusting a magnet disposed in a device housing of the first sensor component.

20. The system of claim 10, wherein the first combination of spacers comprises a plurality of differently-sized spacers.

* * * * *